(12) United States Patent
Retter et al.

(10) Patent No.: US 8,091,800 B2
(45) Date of Patent: Jan. 10, 2012

(54) DRIPPERS AND PIPE COUPLERS

(75) Inventors: Jakob Dan Retter, Kibbutz Hazerim (IL); Ron Keren, Kibbutz Hatzerim (IL)

(73) Assignee: Netafim, Ltd., Tel Aviv (IL)

( * ) Notice: Subject to any disclaimer, the term of this patent is extended or adjusted under 35 U.S.C. 154(b) by 375 days.

(21) Appl. No.: 12/295,725

(22) PCT Filed: Apr. 9, 2006

(86) PCT No.: PCT/IL2006/000448
§ 371 (c)(1),
(2), (4) Date: Jun. 3, 2009

(87) PCT Pub. No.: WO2007/116389
PCT Pub. Date: Oct. 18, 2007

(65) Prior Publication Data
US 2009/0243146 A1 Oct. 1, 2009

(51) Int. Cl.
*A01G 25/02* (2006.01)
(52) U.S. Cl. ........ 239/272; 239/271; 239/542; 239/547; 264/250; 285/5
(58) Field of Classification Search ................. 239/542, 239/547, 571, 271, 272; 264/250; 285/5
See application file for complete search history.

(56) References Cited

U.S. PATENT DOCUMENTS

| 3,885,743 | A | * | 5/1975 | Wake | 239/542 |
| 4,105,162 | A | * | 8/1978 | Drori | 239/109 |
| 4,281,798 | A | * | 8/1981 | Lemelstrich | 239/542 |
| 4,522,339 | A | | 6/1985 | Costa | |
| 4,589,595 | A | | 5/1986 | Havens | |
| 5,413,282 | A | | 5/1995 | Boswell | |

FOREIGN PATENT DOCUMENTS

| AU | 633097 | 1/1993 |
| EP | 0529497 | 3/1993 |
| FR | 1085009 | 1/1955 |
| FR | 1096671 | 6/1995 |
| FR | 2816027 | 5/2002 |

OTHER PUBLICATIONS

International Search Report from PCT/IL2006/000448, dated Mar. 7, 2007.

* cited by examiner

*Primary Examiner* — Dinh Nguyen
(74) *Attorney, Agent, or Firm* — Womble Carlyle

(57) ABSTRACT

A drip irrigation device for distributing a portion of the water flowing in an irrigation pipe to a plant, the device comprising: a housing formed from a relatively soft plastic; and a connector for coupling the housing to the irrigation pipe comprising a bayonet for puncturing the irrigation pipe formed from a relatively hard material over-molded onto a feature of the housing made from the soft plastic.

13 Claims, 5 Drawing Sheets

DRIPPERS AND PIPE COUPLERS

RELATED APPLICATIONS

The present application is a US National Phase of PCT Application No. PCT/IL2006/000448, filed on Apr. 9, 2006, the disclosure of which is incorporated herein by reference.

FIELD OF THE INVENTION

The invention relates to drippers that provide water for plant irrigation and press-fit pipe couplers for connecting pipes, in particular irrigation pipes.

BACKGROUND OF THE INVENTION

Irrigation systems that deliver water, often containing plant nutrients, pesticides and medications, to plants via networks of irrigation pipes are very well known. In many such irrigation networks, water from the pipes is delivered to the plants by drippers that are coupled to the pipes at appropriate locations along their lengths. In many instances, the drippers are configured to deliver a substantially same regulated amount of water to a region substantially independent of water pressure in the pipe at the point at which they are coupled to the pipe. In general, the irrigation pipes are formed from a plastic and the drippers comprise a suitable formed "coupling nipple" for connecting the drippers to the irrigation pipes. A dripper is connected to an irrigation pipe by forming a hole in the pipe and pushing its coupling nipple through the hole. The coupling nipple is formed so that after it is pushed through the hole it fits snuggly in the hole and seals the dripper to the pipe to prevent seepage of water from the hole. For many irrigation systems and/or drippers the hole is formed using a specially designed "punch tool".

To simplify connecting drippers to irrigation pipes, some drippers are formed with a self-puncturing coupling nipple having a sharp point so that the dripper may be coupled to an irrigation pipe by pressing its coupling nipple to the pipe with sufficient pressure so that the coupling nipple punctures and penetrates the pipe wall. The coupling nipple is shaped so that once it punctures and penetrates the irrigation pipe wall, it remains securely lodged in the hole that it formed. Self-puncturing drippers are used with irrigation pipes whose walls are sufficiently soft and pliable so that a self-puncturing dripper may be coupled to an irrigation pipe with the application of a moderate level of, generally manual, force.

Self-puncturing drippers are conventionally formed from a relatively hard plastic so that the coupling nipple maintains sufficient rigidity and sharpness to puncture an irrigation pipe. However, the hard plastics, for example polyacetal (POM), typically used to produce self-puncturing drippers are generally expensive and are relatively susceptible to damage from prolonged contact with many of the plant nutrients, pesticides and medications that are comprised in water delivered to plants by an irrigation system.

Often, when setting up an irrigation system, irrigation pipes of different lengths have to be connected to provide a desired configuration of pipes and drippers. Press-fit pipe couplers are frequently used to couple the pipes. A press-fit pipe coupler usually comprises a tube having formed on its outer surface annular "gripping" ribs that are shaped with a "gripping" edge. To join two irrigation pipes, each end of the tube is pressed into an end of a different one of the pipes. The radius of the tube and a distance at which the gripping edges are located from the tube surface are such that after an end of the tube is pressed into a pipe end, the tube lodges snuggly in the pipe with the gripping edge of at least one rib "biting" into the inner wall of the pipe.

Some press-fit couplers, which are used in low pressure irrigation systems, are formed by injection molding from relatively soft inexpensive plastics. They are not generally convenient for use in high pressure systems because their "soft plastic" gripping ribs do not provide a secure purchase on the inside walls of irrigation pipes into which they are inserted. If used in high pressure irrigation systems, soft plastic press-fit couplers are generally connected to irrigation pipes using external clamps or rings that are tightened about the pipes to squeeze the pipe walls to the couplers to assure secure connection of the couplers to the pipes. To make press-fit pipe couplers that generally do not require clamping accessories to provide a secure fit of the couplers to pipes, press-fit pipe couplers are injection-molded from an appropriately hard plastic so that their gripping ribs have sufficient rigidity to maintain their bite on walls of irrigation pipe they couple and prevent the pipes from separating during normal use. As in the case of the drippers, the hard plastics used to form press-fit pipe couplers are relatively expensive and generally susceptible to damage from prolonged contact with many of the materials that are added to water used to irrigate plants.

A generally preferred plastic used for irrigation applications and products, and from which drippers are usually formed and injection-molding equipment used to produce the dripper adapted to mold, is polypropylene. Polypropylene is relatively cheap, abundant and resistant to damage by nutrients and other materials carried by water delivered to plants by irrigation systems. However, polypropylene is a relatively soft plastic and is not suitable for forming self-puncturing coupling nipples that are required to maintain a sharp, rigid point in order to puncture the wall of an irrigation pipe or for forming press-fit pipe couplers that have to maintain hard gripping edges that maintain their shape.

SUMMARY OF THE INVENTION

An aspect of some embodiments of the invention relates to providing a self-puncturing dripper formed from a relatively soft plastic that has a wear resistant self-puncturing coupling nipple that maintains a sufficiently rigid, pointed shape so that the nipple may be used to puncture the wall of an irrigation pipe.

According to an aspect of some embodiments of the invention, the self-puncturing nipple comprises a stem having a sharp, pointed "cap", hereinafter referred to as a "bayonet", formed from a relatively hard material such as a hard plastic. Optionally, the stem is an integral part of the body of the dripper or a part thereof and is formed from a same soft plastic from which the dripper or part thereof is formed. Puncturing is performed by the bayonet, and the material from which it is formed is chosen to have appropriate hardness so that the bayonet maintains rigidity and sharpness sufficient to be efficiently used to puncture the wall of an irrigation pipe. Hereinafter, a dripper in accordance with an embodiment of the invention is, optionally, referred to as a "bayonet" dripper.

In an embodiment of the invention, the bayonet is injection molded onto the coupling nipple stem or the stem is molded "into" the bayonet using a two-shot or over-molding process. Optionally, the body of the dripper and stem are formed from a material comprising polypropylene and/or polyethylene. Optionally, the material from which the bayonet is formed comprises at least one of polyacetal (POM), polycarbonate (PC), polyamide (PA), polybutylene terephthalate (PBT) and/or polyphenylene oxide (PPO). Additionally or alternatively, the material from which the bayonet is formed comprises a composite material. Optionally, the composite material comprises a plastic reinforced with fibers, such as glass or carbon fibers.

An aspect of some embodiments of the invention relates to providing a press-fit pipe coupler comprising a tube made from a relatively soft plastic and having, optionally annular, gripping ribs that maintain relatively hard gripping edges.

According to an aspect of some embodiments of the invention, gripping ribs of the press-fit pipe coupler are formed from a hard wear resistant plastic that is over-molded onto the tube and maintains a sharp gripping edge.

There is therefore provided in accordance with an embodiment of the invention, a drip irrigation device for distributing a portion of the water flowing in an irrigation pipe to a plant, the device comprising: a housing formed from a relatively soft plastic; and a connector for coupling the housing to the irrigation pipe comprising a bayonet for puncturing the irrigation pipe formed from a relatively hard material over-molded onto a feature of the housing made from the soft plastic. Optionally, the feature of the housing is a stem.

Additionally or alternatively, the relatively hard material optionally comprises a relatively hard plastic. Optionally, the hard plastic comprises at least one plastic chosen from the group of plastics consisting of: polyacetal (POM) polycarbonate (PC), polyamide (PA), polybutylene terephthalate (PBT) and polyphenylene Oxide (PPO). In some embodiments of the invention, the hard material comprises a composite material. Optionally, wherein the composite material comprises a plastic reinforced with fibers. Optionally, the fibers comprise glass fibers. Additionally or alternatively, the fibers optionally comprise carbon fibers. In some embodiments of the invention, the plastic reinforced with the fibers comprises polypropylene (PP) and/or polyethylene (PE).

In some embodiments of the invention, the bayonet and the housing feature are formed with locking features that mechanically lock the bayonet to the feature.

In some embodiments of the invention, the materials of the bayonet and the housing feature are bonded at an interface between them.

In some embodiments of the invention, the soft plastic comprises polypropylene and/or polyethylene.

There is further provided in accordance with an embodiment of the invention, a press-fit pipe coupler for connecting at least one first pipe to a second pipe or apparatus, the coupler comprising: at least one tube formed from a relatively soft plastic; and at least one protrusion injection over-molded on each of the at least one tube from a relatively hard plastic for gripping an inside surface of the first pipe.

Optionally, the at least one tube comprises a single tube. Alternatively, the at least one tube comprises a plurality of tubes.

There is further provided in accordance with an embodiment of the invention, a method of producing a drip irrigation device for distributing a portion of the water flowing in an irrigation pipe to a plant, the method comprising: injection molding a housing from a relatively soft plastic; and injection molding a relatively hard material to form a bayonet for puncturing the irrigation pipe so that the bayonet couples to a feature of the housing.

Optionally, the injection molding comprises forming the housing first. Alternatively, the injection molding comprises forming the bayonet first.

There is further provided in accordance with an embodiment of the invention, a method of producing a press-fit pipe coupler for connecting at least one first pipe to a second pipe or apparatus, the method comprising: injection molding a relatively soft plastic to form at least one tube; and injection molding a relatively hard material to form at least one protrusion on each of the at least one tube for gripping an inside surface of the first pipe.

BRIEF DESCRIPTION OF FIGURES

Non-limiting examples of embodiments of the present invention are described below with reference to figures attached hereto. In the figures, identical structures, elements or parts that appear in more than one figure are generally labeled with a same symbol in all the figures in which they appear. Dimensions of components and features shown in the figures are chosen for convenience and clarity of presentation and are not necessarily shown to scale. The figures are listed below.

DETAILED DESCRIPTION OF EXEMPLARY EMBODIMENTS

Figure 1:
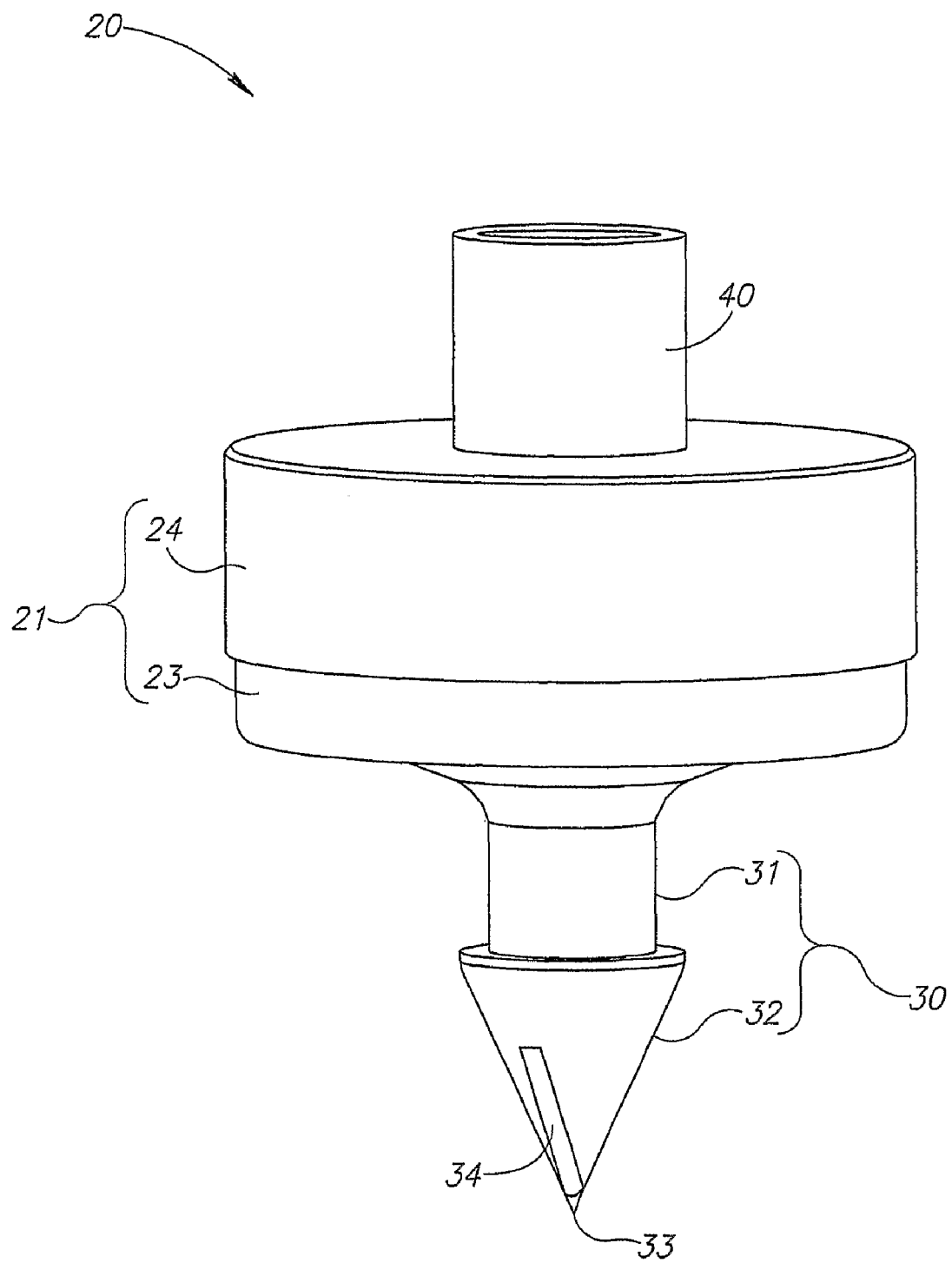
FIG. 1 schematically shows a bayonet dripper comprising a coupling nipple having a bayonet, in accordance with an embodiment of the invention.

FIG. 1 schematically shows a bayonet dripper 20 comprising a housing 21 having a bayonet coupling nipple 30 comprising a stem 31 and a bayonet 32, in accordance with an embodiment of the invention. Water enters dripper 20 from a pipe to which the dripper is connected through coupling nipple 30. Water exits the dripper to irrigate a plant or plants, optionally via an outlet tube 40. Optionally, bayonet dripper 20 is a regulated dripper that provides a same regulated output flow of water substantially independent of inlet water pressure for a range of water pressures. Only features of bayonet dripper 20 germane to the discussion are shown in FIG. 1.

Housing 21 is optionally formed from male and female snap-fit components 23 and 24 respectively that are formed by injection molding as separate pieces and are snapped together to form the housing. Male component 23 is optionally formed with bayonet coupling nipple 30 and female component 24 is optionally formed with water outlet tube 40. Bayonet 32 is formed with a sharp tip 33 and a water inlet orifice 34 that communicates with an inlet channel (not shown) formed in stem 31. Water enters dripper 20 through the inlet orifice 34 and flows into the dripper housing through the inlet channel in the stem.

In an embodiment of the invention, stem 31 of coupling nipple 30 is formed as an integral part of male component 23, optionally from a relatively soft inexpensive plastic, such as polypropylene and/or soft polyethylene, that is relatively resistant to damage by nutrients and chemicals typically carried by water used to irrigate and cultivate plants. Bayonet 32 is formed from an appropriately hard material so that the bayonet can be efficiently used to puncture the wall of an irrigation pipe. Optionally, coupling nipple 30 is formed by injection over-molding in which bayonet 32 is formed over the end of stem 31 or stem 31 is formed "into" bayonet 32. Optionally, bayonet 32 is formed from a material comprising a relatively hard, wear resistant plastic, such as polyacetal (POM) polycarbonate (PC), polyamide (PA), polybutylene terephthalate (PBT), polyphenylene oxide (PPO) and/or a composite material optionally comprising a plastic reinforced with fibers, such as glass or carbon fibers.

The end of stem 31 on which bayonet 32 is over-molded is optionally formed with at least one locking feature so that after over-molding the bayonet is mechanically locked to the stem. In some embodiments of the invention, the relatively soft plastic used for dripper housing 21 and the relatively hard plastic used for bayonet 32 bond "naturally" as a result of the over-molding process and/or contact thereafter. For example, the plastics might bond chemically and/or mechanically as a result of intermixing of the two plastics at their interface. Materials suitable for such bonding are, optionally, polypropylene for the relatively soft plastic and a composite material, such as polypropylene reinforced with fibers, for the relatively hard plastic.

Figure 2A:
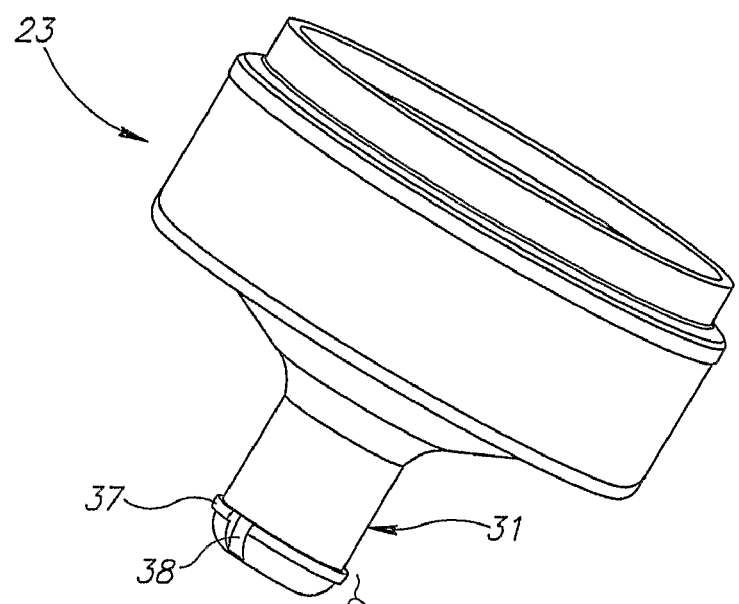
FIGS. 2A and 2B schematically show a component of the bayonet dripper shown in FIG. 1 before and after over-molding the bayonet on the coupling nipple stem, in accordance with an embodiment of the invention.
Figure 2B:
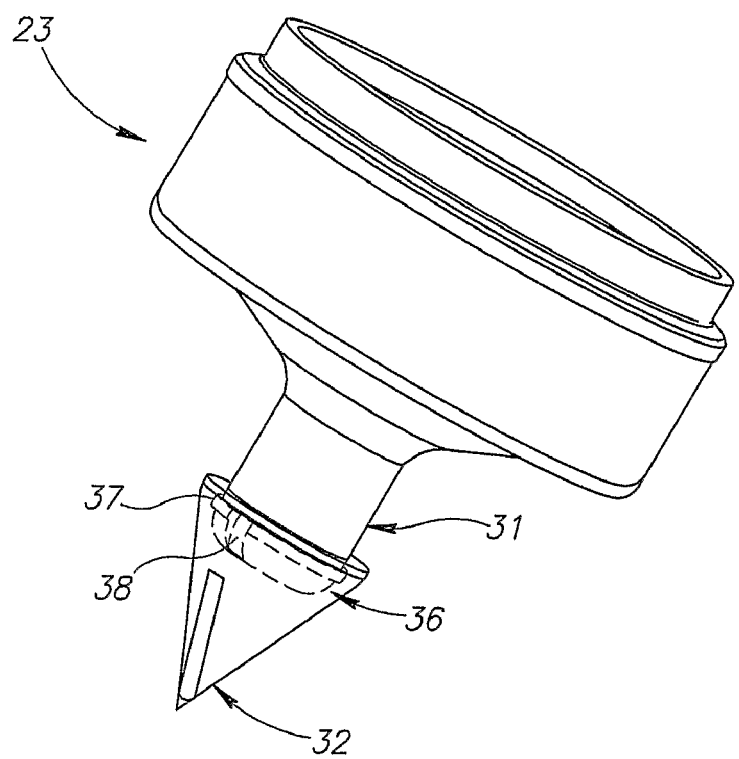

FIGS. 2A and 2B schematically show male snap-fit component 23 before and after over-molding bayonet 32 on stem 31 and illustrate locking features in accordance with an embodiment of the invention that lock bayonet 32 to the stem after over-molding. Features of stem 31 in FIG. 2B that are covered by bayonet 32 after over-molding are shown in ghost lines.

Referring to FIG. 2A, stem 31 has an end 36 optionally formed with at least one protruding rim 37 and a groove 38. During over-molding, the plastic from which bayonet 32 (FIG. 2B) is formed flows over and encompasses rim 37, and fills groove 38. When the plastic hardens, bayonet 32 is locked to rim 37 so that the bayonet cannot easily be torn from stem 31 and the bayonet is prevented from rotating relative to the stem by plastic that fills groove 38.

Stem 31 may be formed with locking features to mechanically lock a bayonet in accordance with an embodiment of the invention to the stem that are different from the locking features, i.e. rim 37 and groove 38, shown in FIGS. 2A and 2B. For example, end 36 may be formed with an annular recess having at least one tooth that extends from the bottom of the groove. The plastic used to form the bayonet flows into the recess during over-molding and after hardening locks the bayonet to the stem. The at least one tooth prevents the bayonet from rotating relative to the stem. In some embodiments of the invention, locking features are additionally or alternatively provided by the bayonet and stem plastics, which bond together because of the over-molding process and/or a natural affinity for each other.

Figure 3:
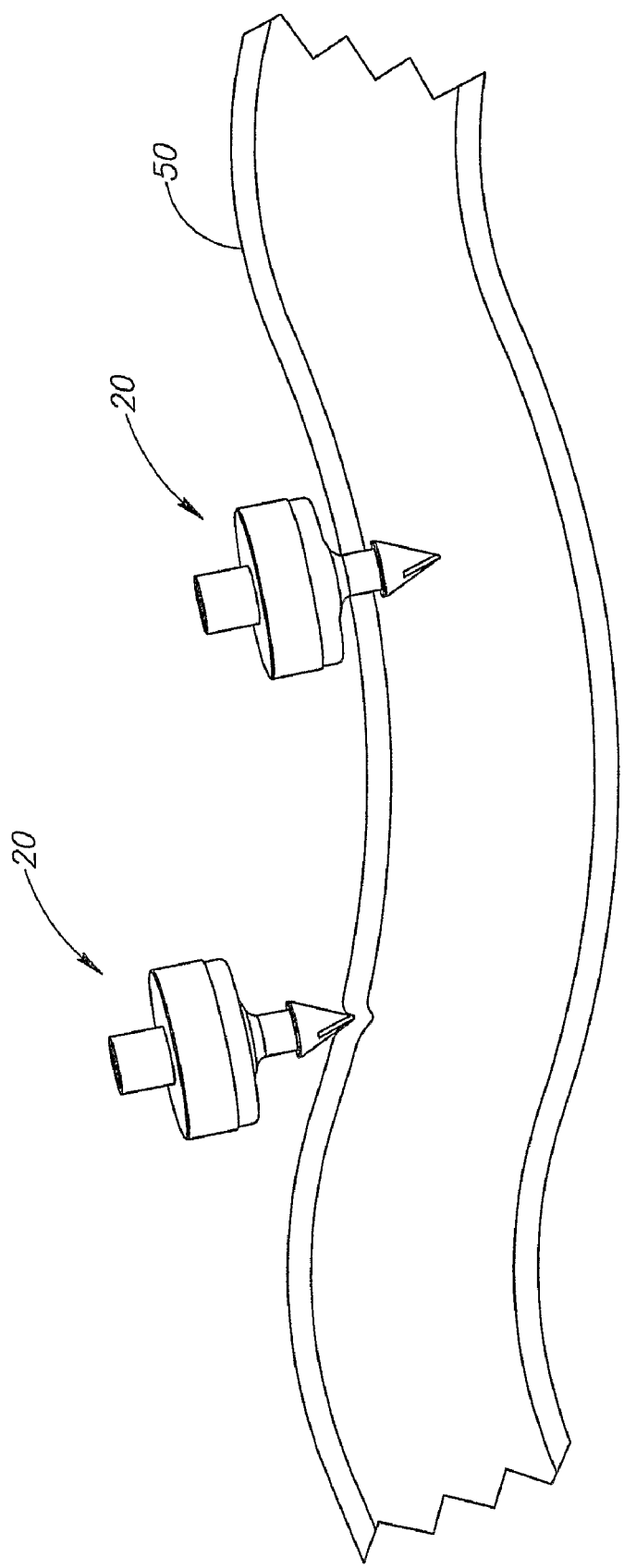
FIG. 3 schematically illustrates coupling a bayonet dripper to an irrigation pipe, in accordance with an embodiment of the invention.

Bayonet dripper 20 is coupled to an irrigation pipe by pressing bayonet 32 to the wall of the pipe with sufficient force so that tip 33 of the bayonet punctures and forms a hole in the wall and bayonet nipple 30 penetrates into the pipe so that its stem 31 seats in the hole. FIG. 3 schematically shows an irrigation pipe 50 and two bayonet drippers 20. One of bayonet drippers 20 is schematically shown puncturing the wall of pipe 50 so that it may be coupled to the pipe and the other bayonet dripper 20 is shown seated in the pipe after it has punctured the wall of the pipe.

Figure 4A:
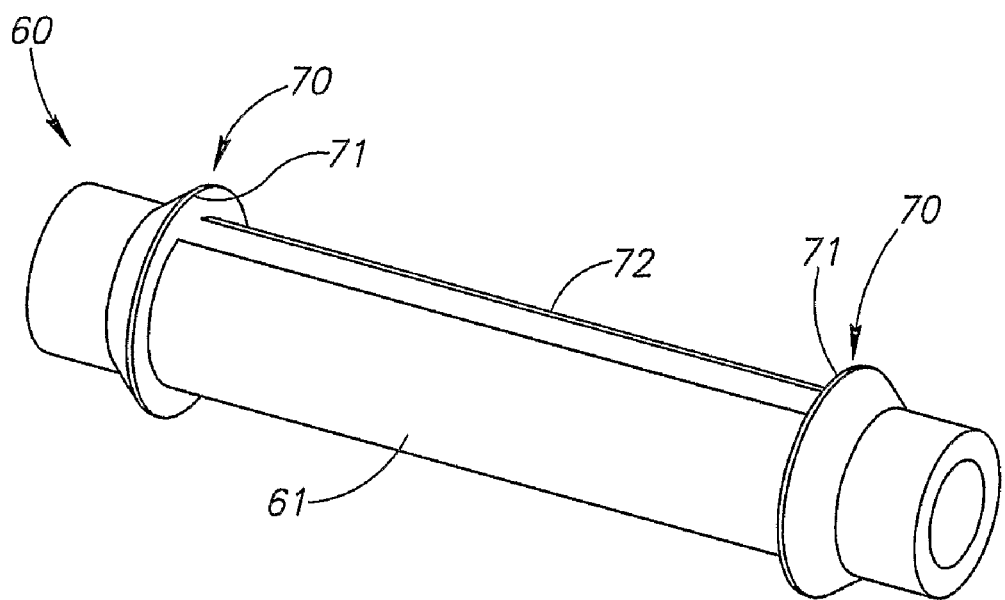
FIG. 4A schematically shows a press-fit pipe coupler comprising a tube formed from a first relatively soft plastic and gripping ribs formed from a hard, wear resistant plastic, in accordance with an embodiment of the invention.

FIG. 4A schematically shows a press-fit pipe coupler 60 for connecting two irrigation pipes, in accordance with an embodiment of the invention. Pipe coupler 60 comprises a tube 61 formed from a relatively soft chemically resistant plastic and optionally two gripping ribs 70 having gripping edges 71 formed from a relatively hard, wear resistant plastic. Optionally, as shown in FIG. 4A, gripping ribs 70 are connected by at least one strut 72. Strut 72, as explained below, is an artifact of an injection over-molding process used to produce press-fit coupler 60. Optionally, the soft plastic comprises polypropylene and/or polyethylene. Optionally, the material from which the gripping ribs are formed comprises at least one of polyacetal (POM), polycarbonate (PC), polyamide (PA), polybutylene terephthalate (PBT) and/or polyphenylene oxide (PPO). Additionally or alternatively, the material from which ribs 70 is formed comprises a composite material. Optionally, the composite material comprises a plastic reinforced with fibers, such as glass or carbon fibers.

In an embodiment of the invention, gripping ribs 70 are over-molded onto tube 61, which is formed with at least one locking feature that functions to mechanically lock the ribs in place. Optionally, the locking features comprise a pattern of recesses into which the plastic from which the ribs are formed flow during over-molding.

Figure 4B:
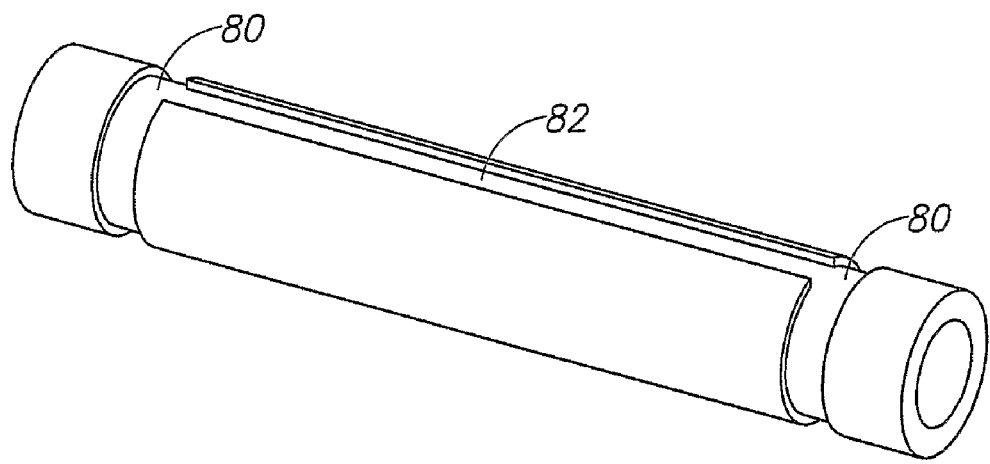
FIG. 4B schematically shows the tube of the press-fit pipe coupler shown in FIG. 4A before over-molding with gripping ribs, in accordance with an embodiment of the invention.

FIG. 4B schematically shows tube 61 formed with a pattern of recesses that function to lock gripping ribs 70 in place. Optionally, the pattern of recesses comprises an annular recess 80 for each gripping rib and a linear recess 82 that connects the annular recesses. Linear recess 82 functions as a flow channel along which liquid plastic flows during injection molding to fill cavities in a die used to form ribs 70. The channel allows liquid plastic for both ribs 70 to be fed from an optionally single injection orifice in the die located along the channel. The liquid plastic flows from the injection point in both directions along channel 82 to fill annular recesses 80 and the cavities. Annular recesses 80 prevent gripping ribs 70 from moving along the length of tube 61 after they are over-molded onto the tube and recess 82 prevents the ribs from rotating relative to the tube axis.

In some embodiments of the invention, as with the dripper, locking features are, additionally or alternatively, provided by the rib and tube plastics, which bond together because of the over-molding process and/or a natural affinity for each other.

Figure 5:
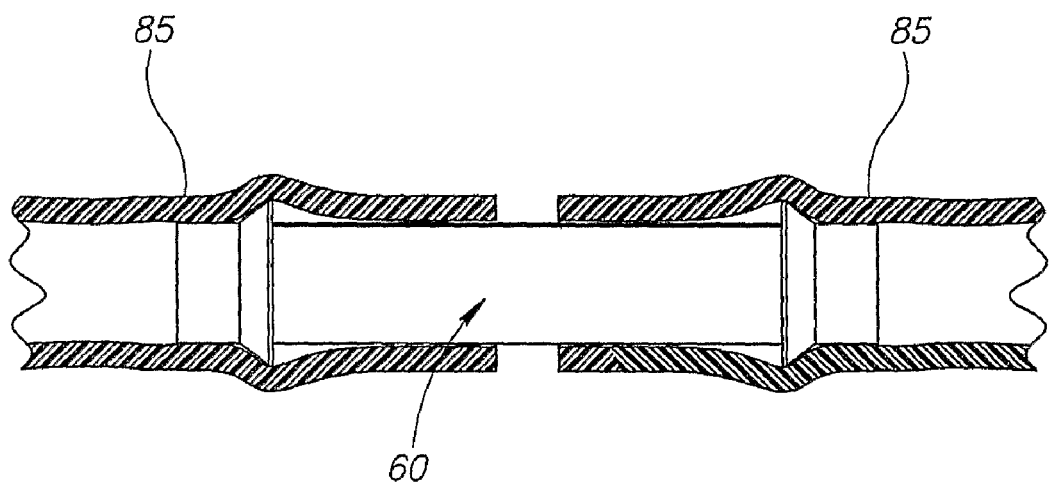
FIG. 5 schematically shows the press-fit pipe coupler shown in FIG. 4 coupling two irrigation pipes, in accordance with an embodiment of the invention.

FIG. 5 schematically shows a cross-section of press-fit coupler 60 connecting two irrigation pipes 85.

It is noted, that whereas press-fit pipe coupler 60 is configured to connect only two pipes and comprises a straight tube on which hard gripping ribs are formed, a press-fit pipe coupler, in accordance with an embodiment of the invention, can be configured to connect more than two pipes. For example, a press-fit coupler in accordance with an embodiment of the invention, can comprise a configuration of a plurality tubes, such as a "T" or a "star" configuration of tubes, formed from a soft plastic with each pipe having formed thereon a gripping rib formed from a hard plastic. A press-fit coupler in accordance with an embodiment of the invention may also be used to connect an irrigation pipe to an irrigation apparatus, such as a sprinkler, rather than another irrigation pipe. The sprinkler, which may advantageously be formed from a soft plastic, may comprise a tube formed from the same plastic having over-molded thereon a gripping rib from a hard plastic for connecting the tube, and thereby the sprinkler, to an irrigation pipe.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The invention has been described with reference to embodiments thereof that are provided by way of example and are not intended to limit the scope of the invention. The described embodiments comprise different features, not all of which are required in all embodiments of the invention. Some embodiments of the invention utilize only some of the features or possible combinations of the features. Variations of embodiments of the described invention and embodiments of the invention comprising different combinations of features than those noted in the described embodiments will occur to persons of the art. The scope of the invention is limited only by the following claims.

The invention claimed is:

1. A drip irrigation device for distributing a portion of the water flowing in an irrigation pipe to a plant, the device comprising:
   a housing formed from a relatively soft plastic; and
   a connector for coupling the housing to the irrigation pipe comprising a bayonet for puncturing the irrigation pipe formed from a relatively hard material over-molded onto a feature of the housing made from the soft plastic; wherein:
   the bayonet and the housing feature are formed with locking features that mechanically lock the bayonet to the feature of the housing.

2. A drip irrigation device according to claim 1 wherein the feature of the housing is a stem.

3. A drip irrigation device according to claim 2 wherein:
   the stem has a stem end provided with a protruding rim and a groove: and
   the groove is occupied by the relatively hard material of which the connected is formed.

4. A drip irrigation device according to claim 3 wherein:
   the connector is prevented from rotating relative to the stem by the relatively hard material occupying the groove.

5. A drip irrigation device according to claim 1 wherein the relatively hard material comprises a relatively hard plastic.

6. A drip irrigation device according to claim 5 wherein the hard plastic comprises at least one plastic chosen from the group of plastics consisting of: polyacetal (POM) polycarbonate (PC), polyamide (PA) and polyphenylene oxide (PPO).

7. A drip irrigation device according to claim 1 wherein the hard material comprises a composite material.

8. A drip irrigation device according to claim 7 wherein the composite material comprises a plastic reinforced with fibers.

9. A drip irrigation device according to claim 8 wherein the fibers comprise glass fibers.

10. A drip irrigation device according to claim 8 wherein the fibers comprise carbon fibers.

11. A drip irrigation device according to claim 8 wherein the plastic reinforced with the fibers comprises polypropylene (PP) and/or soft polyethylene (PE).

12. A drip irrigation device according to claim 1 wherein the materials of the bayonet and the housing feature are bonded at an interface between them.

13. A drip irrigation device according to claim 1 wherein the soft plastic comprises polypropylene and/or polyethylene.

* * * * *